Jan. 23, 1951 C. S. DAYTON 2,539,185
THERMAL MOTOR
Filed Dec. 29, 1949

Inventor:
Carl S. Dayton,
by *Sheridan* *Ross*
His Attorney.

Patented Jan. 23, 1951

2,539,185

UNITED STATES PATENT OFFICE 2,539,185

THERMAL MOTOR

Carl S. Dayton, Bridgeport, Conn., assignor to General Electric Company, a corporation of New York Application December 29, 1949, Serial No. 135,739

1 Claim. (Cl. 172—126)

This invention relates to thermal motors and, in particular, to a thermal motor that is operated by the heating and cooling action of a bimetallic strip. In many applications, such as timers for toasters or for regulating the length of egg boiling, it is desirable to have a slow speed motor to operate a switch that controls the duration of heat to an electric appliance.

Heretofore, the desired slow speed of operation has been obtained by combining a high-speed motor and a reducing gear. Gear trains, however, are expensive and sometimes are cumbersome, particularly where it is desired to install the slow speed timer motor in an electric appliance such as a toaster.

It is an object of this invention to provide a slow speed thermal motor.

It is a further object of this invention to provide a slow speed thermal motor that does not require intricate and cumbersome gear trains.

It is a still further object of this invention to provide a slow-speed thermal motor that is compact and that involves the use of no complicated ratios.

Broadly, this invention comprises a device for cyclically heating and cooling a bimetallic strip which, in turn, through means of an over-running clutch, intermittently drives a rotatable shaft at a slow speed.

These and other objects and advantages of this invention will become apparent and the invention will be more clearly understood from the following description referring to the accompanying drawing, and the features of novelty which characterize this invention will be pointed out with particularity in the claims annexed to and forming a part of this specification.

Figure 1:
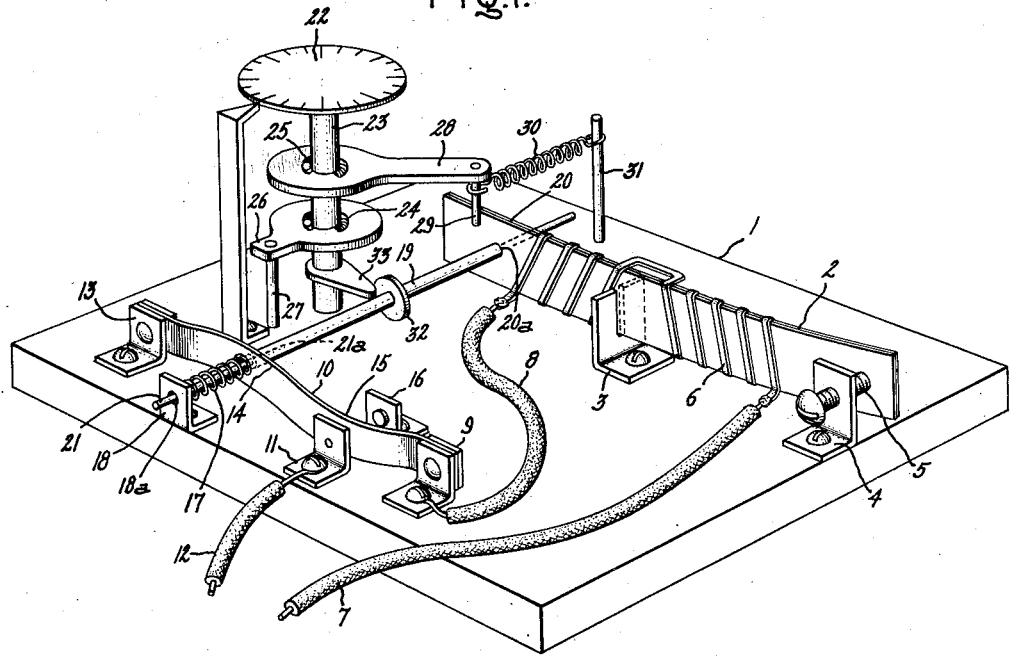
Figure 2:
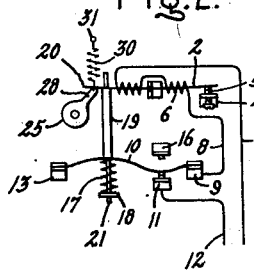
Figure 3:
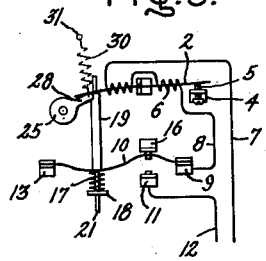
Figure 4:
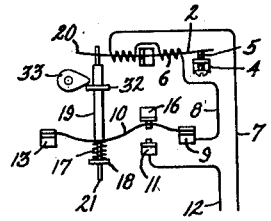

Referring to the drawing, Fig. 1 is a front elevation view of the thermal motor, which is the subject matter of this invention; Figs. 2, 3 and 4 are schematic diagrams indicating the operative stages of the elements of this invention.

Referring to the drawing, a base plate 1 is shown having the operative elements of this invention mounted on it. A bimetallic element 2 is mounted on plate 1 by a bracket 3 and one end of element 2 is prevented from deflecting relative to bracket 3 by an adjustable stop 4, which contains a screw 5 for regulating the position of the end of the bimetallic element. A heating resistor 6 is wrapped around, or otherwise secured, to bimetallic element 2 in a manner that imparts heat to the bimetallic element, causing it to deflect. One end of resistor 6 is connected by lead 7 directly to a power supply (not shown), while the other end of resistor 6 is connected by lead 8 to a terminal 9. An electrical conducting column spring 10, when in the closed position, electrically connects terminal 9 with a contact 11 which, in turn, is connected by conductor 12 to the power supply. In the position indicated in Fig. 1, then, current flows through conductor 7, through resistor 6, through conductor 8 to terminal 9, through column switch 10 to contact 11 and thence back to the power supply. In this position, the bimetallic element 2 is being heated by resistor 6.

Column spring 10 is rigidly secured to terminal 9 at one end and to a bracket 13 at the other end. The length of column spring 10 is somewhat greater than the distance between terminal 9 and bracket 13; consequently, when a portion 14 of the spring is moved to one side or the other of an imaginary straight line that connects terminal 9 and bracket 13, a snap action is imparted to a section 15 of the column spring adjacent contact 11. In other words, as portion 14 is moved from the position shown in Fig. 1 across the imaginary straight line joining terminal 9 and bracket 13, a snap action is imparted to section 15, causing it to break away from contact 11 and rest against a stop 16, secured to plate 1 on the opposite side of column spring 10 from contact 11.

A compression spring 17, mounted between a support 18 and portion 14 of column spring 10 biases portion 14 towards the position indicated in Fig. 1, thereby closing the circuit between terminal 9 and contact 11.

A rigid operating rod 19, which includes a shoulder and an extended portion of reduced diameter on each end, is positioned between end 20 of bimetallic element 2 and portion 14 of column spring 10. When element 2 is heated, end 20 pushes on shoulder 20a of rod 19 while shoulder 21a pushes on portion 14 of column spring 10. Support 18 includes a bearing 18a that guides the axial movement of an extension 21 on rod 19. Extension 21, in turn, axially aligns spring 17, maintaining it in position to apply a continuous bias on portion 14 of column spring 10.

As bimetallic element 2 is heated, it bends about bracket 3 towards column spring 10 causing operating rod 19 to push against portion 14 of column spring 10 to the extent that portion 14 crosses the imaginary line connecting terminal 9 and bracket 13, whereupon section 15 of the column spring snaps away from contact 11 to break the circuit to resistor 6. When bimetallic element 2 is no longer being heated, it tends to return to its original position, shown in Fig. 1, and the force of spring 17 on portion 14 of column spring 10 helps return end 20 of element 2 to its original position. As portion 14 crosses the center line, section 15 of column spring 10 restores the circuit to resistor 6 and another cycle is started.

A dial 22 is rigidly secured to a shaft 23 that is rotatably mounted on base plate 1 adjacent operating rod 19. A pair of over-running clutches 24 and 25 are mounted on shaft 23. Clutch 24 includes an arm 26 secured to a pin 27 that is fastened to base 1. Clutch 24 permits clockwise rotation of shaft 23, as viewed from dial 22, but prevents counterclockwise rotation of the shaft. It is possible, then, to turn shaft 23 clockwise by turning dial 22 or by rotating shaft 23 itself. Over-running clutch 25, which includes arm 28, is employed to drive shaft 23 clockwise, but clutch 25 releases when arm 28 is moved counterclockwise, as viewed from the top. With this arrangement, then, if arm 28 is cyclically moved clockwise and then counterclockwise over a predetermined path, an intermittent clockwise rotation is given to shaft 23 and dial 22.

A pin 29 extends vertically downward toward plate 1 from the outer end of arm 28. A spring 30 connects pin 29 with an upright support 31 that is fixed to base 1. Spring 30 pulls against pin 29 to maintain it constantly in slidable contact with end 20 of bimetallic element 2. The arm 28 is initially positioned with the pin 29 against the bimetallic element in its undeflected position so that the initial deflecting movement of the end of the bimetallic element initiates rotation of dial 22. When the bimetallic element is cooling and returning to the position shown in Fig. 1, spring 30 pulls pin 29, maintaining it in constant contact with the bimetallic element. Consequently, as bimetallic element 2 goes through its cyclic deflecting motions, it imparts an intermittent clockwise rotation to shaft 23 and dial 22.

A collar 32 is rigidly secured to operating rod 19 while a cooperating cam 33 is secured to and rotatable with shaft 23. When cam 33 makes substantially a complete clockwise revolution from its position indicated in Fig. 1, it engages collar 32, driving it towards support 18 and forcing portion 14 of column spring 10 across the imaginary line between terminal 9 and bracket 13 which causes section 15 of the column spring to snap away from contact 11 to interrupt the circuit to resistor 6. Under these conditions, cam 33 locks section 15 of the column spring in the open position and the dial cannot turn again until cam 33 is manually turned past its engagement with collar 32 to the position indicated in Fig. 1, and thereupon bimetallic element 2 again takes control and drives shaft 23 another complete revolution.

In order to explain more clearly the operation of this invention, reference is made to Figs. 2, 3 and 4. Fig. 2 designates the condition of the elements when current is first supplied to resistor 6. Specifically, bimetallic element 2 is in its cooled position and column spring 10 has closed the circuit, allowing current to pass through resistor 6. In Fig. 2, spring 17 is shown pushing column spring 10 to the normally closed position and spring 30 is maintaining arm 28 in contact with bimetallic element 2. As resistor 6 heats bimetallic element 2, it deflects, pushing arm 28, which rotates shaft 23, and pushing operating rod 19 and portion 14 of column spring 10 until portion 14 crosses the imaginary line joining terminal 9 and bracket 13.

Fig. 3 indicates what happens after portion 14 crosses the imaginary line. Specifically, section 15 snaps away from contact 11, opening the circuit to resistor 6 and allowing the bimetallic element to cool. During the cooling process, springs 17 and 30 indirectly act on element 2 to help restore it to its normal position. The cooling stage continues until portion 14 of column spring 10 once again crosses the imaginary line, whereupon the combined actions of spring 17, spring 30 and column spring 10 act to restore the bimetallic element to its normal position. As the bimetallic element returns to its normal position, section 15 of column spring 10 closes on contact 11, whereupon resistor 6 again heats bimetallic element 2.

Fig. 4 shows the operation of cam 33 on collar 32. Specifically, since shaft 23 cannot be rotated counterclockwise, neither can cam 33, which is secured to it. While spring 17 tends to restore column spring 10 to the normally closed position, its motion is restrained by the action of cam 33 on collar 32. As the bimetallic element continues to cool, end 20 slides along extension 34 and away from shoulder 20a. Manual clockwise rotation of cam 33 beyond the point of its engagement with collar 32 permits spring 17 to force operating rod 19 towards element 2 until shoulder 20a again comes in contact with element 2. Simultaneously, section 15 of spring 10 closes on contact 11 and the cyclic heating of the bimetallic element is again initiated.

Screw 5, which extends through adjustable stop 4, provides a means for regulating the displacement, or stroke length of end 20 of element 2. Naturally, the stroke length directly affects the amount that shaft 23 is turned by clutch 25 and arm 28. The adjustment of the stroke length is provided by adjusting the position of screw 5 in stop 4. As the screw is extended through the stop, the stroke length is decreased and withdrawing the screw from the stop increases the stroke length.

Modifications of this invention will occur to those skilled in the art and it is desired to be understood, therefore, that this invention is not to be limited to the particular arrangement disclosed, but that the appended claim is meant to cover all modifications which are within the spirit and scope of this invention.

What I claim as new and desire to secure by Letters Patent of the United States is:

In a thermal motor, a bimetallic element having a freely movable end, a heating resistor intimately associated with said bimetallic element adapted to heat said element and cause deflection of said freely movable end, means for cyclically supplying current to said resistor comprising a column spring, a switch operated by said column spring having a circuit open and a circuit closed position, and means interpositioned between the freely movable end of said bimetallic element and said column spring to open said switch when said bimetallic element is deflected by heating and to close said switch when said bimetallic element is cool, a rotatable shaft, means for preventing said shaft from rotating in one direction while permitting a free rotation in the opposite direction, said shaft rotating means including an over-running clutch operating in response to the deflection of said bimetallic element to cyclically rotate said shaft unidirectionally in response to the cyclic deflection of said bimetallic element and an arm rigidly secured to said shaft for holding said interpositioned means in a position to maintain said column spring in the open switch position after said shaft has made substantially one complete revolution.

CARL S. DAYTON.

REFERENCES CITED

The following references are of record in the file of this patent:

UNITED STATES PATENTS

| Number | Name | Date |
|---|---|---|
| 1,492,450 | Gregory | Apr. 29, 1924 |
| 2,066,145 | Fink | Dec. 29, 1936 |
| 2,418,831 | Hamilton | Apr. 15, 1947 |
| 2,444,529 | Puster | July 6, 1948 |